Patented Aug. 21, 1934

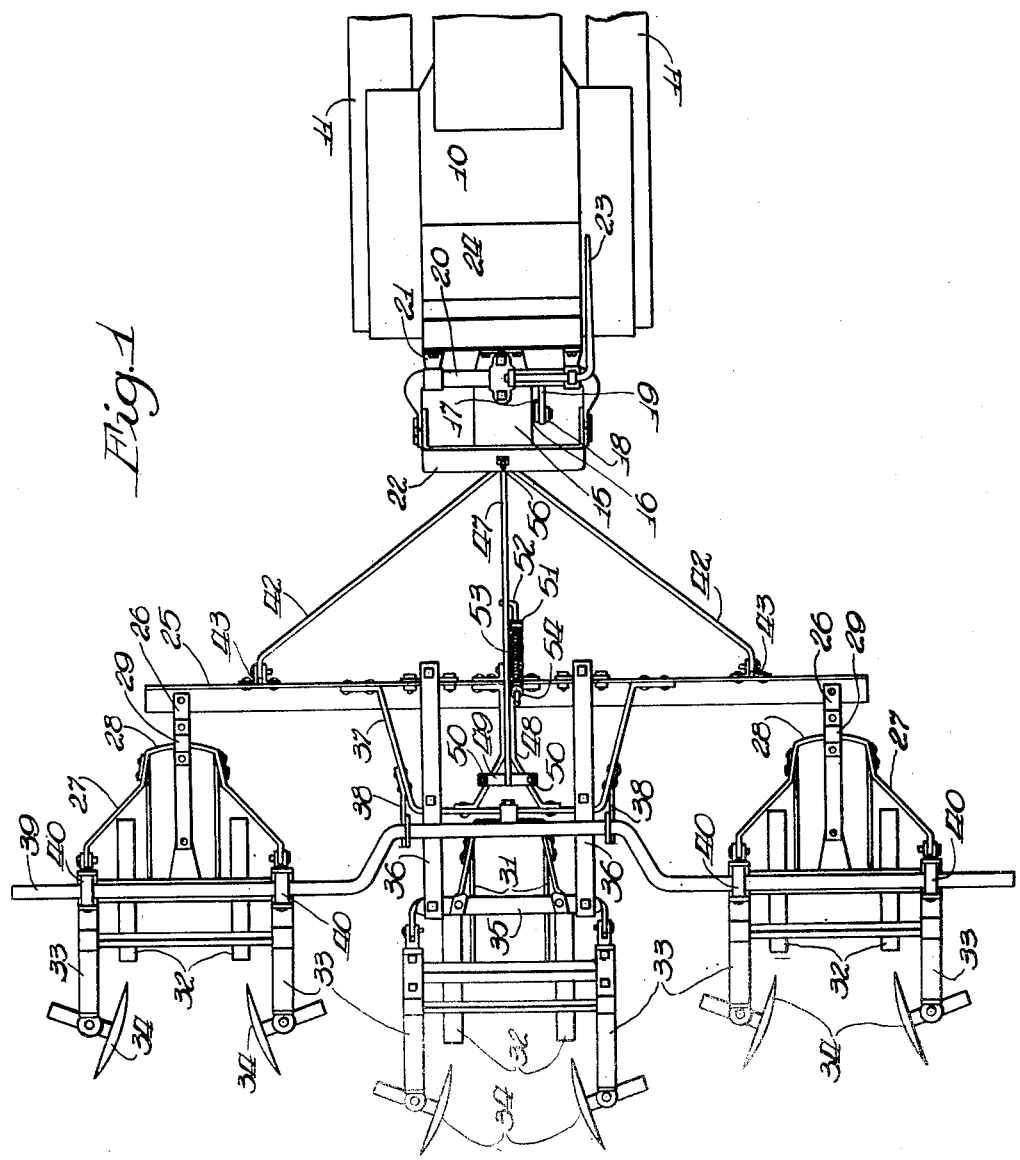

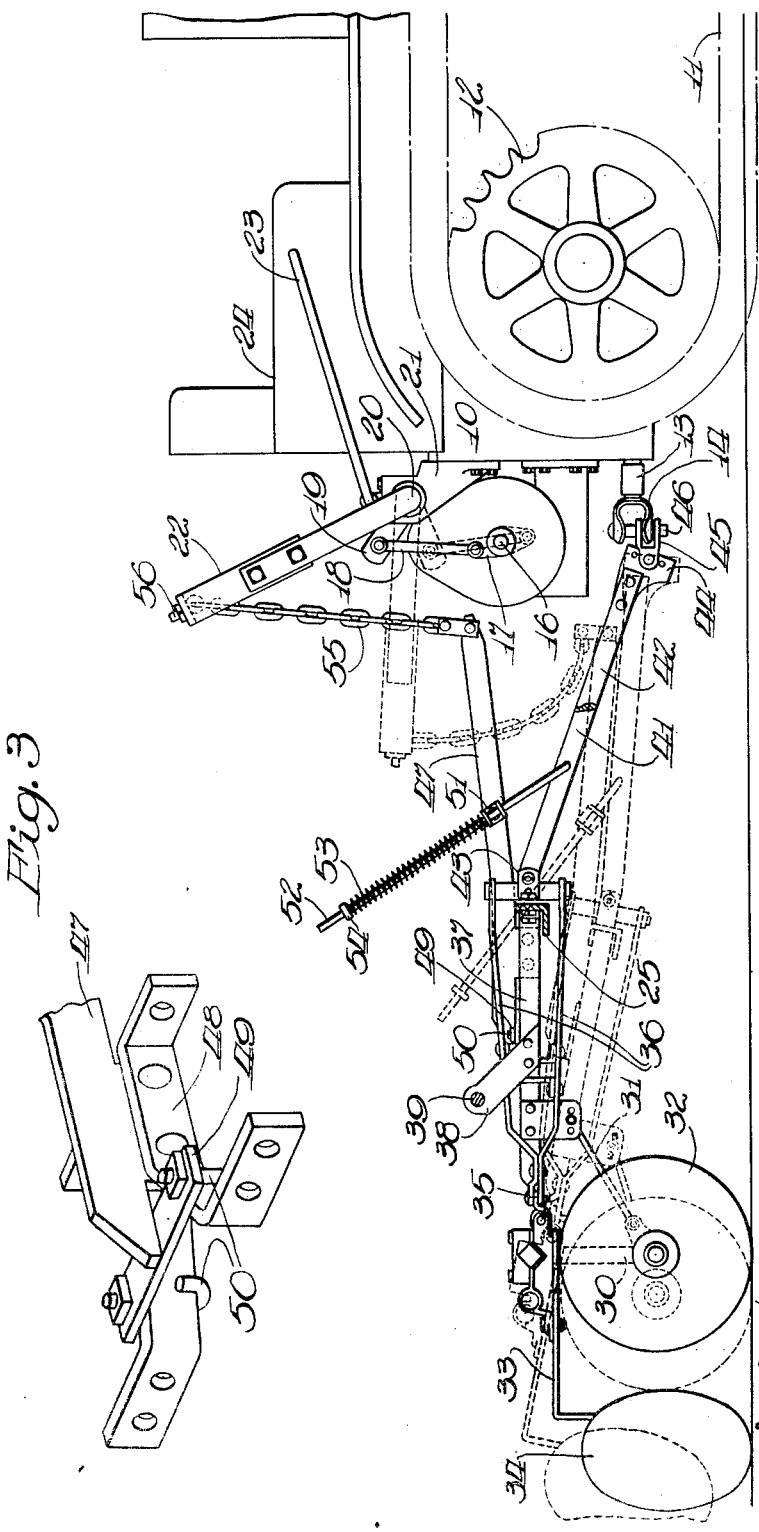

1,971,180

UNITED STATES PATENT OFFICE 1,971,180

TRACTOR CONTROLLED IMPLEMENT

William S. Graham and James Morkovski, Canton, Ill., assignors to International Harvester Company, a corporation of New Jersey Application December 13, 1933, Serial No. 702,142

7 Claims. (Cl. 97—50)

This invention relates to a tractor implement. More specifically it relates to an organization including a tractor, an implement drawn by the tractor, and a power lift for controlling the position of earth working elements carried by the implement.

The principal object of the present invention is to devise a tractor drawn implement construction of a particular form in which a power lift mounted on the tractor is utilized for holding the earth working elements of the implement in soil-engaging position. This object and others which will be apparent from the detailed description to follow are attained by a construction as shown in the drawings, in which:

Figure 1 is a plan view showing the rear portion of a track laying tractor and a three or five-row lister cultivator connected to the drawbar of the tractor;

Figure 2 is a side elevation of the same tractor and implement organization shown in Figure 1; and, Figure 3 is an enlarged perspective of a portion of the implement frame showing the connection therewith of the operating lever.

In the drawings a tractor of the track laying type having a body 10 and track chains 11 driven by sprocket wheels 12 is shown mounted on the tractor body. The showing of the tractor is somewhat diagrammatic, as the construction thereof is not involved in the present invention. At a low point on the rear end of the tractor body 10 a drawbar 13 is mounted for supplying a draft means. A clevis 14 is mounted on the drawbar 13 for pivotally attaching machines to be drawn by the tractor. A power lift casing 15 containing a half revolution power lift mechanism is driven by a power take-off shaft extended from the tractor body into the casing. This mechanism has not been shown in detail as it is not a part of the present invention. The Patent No. 1,911,373, May 30, 1933, shows and claims a half-revolution power lift mechanism of this type. A shaft 16 projecting from the power lift casing carries a crank 17 to which a link 18 is pivotally connected. The link 18 is pivotally connected to a lever arm 19 rigidly connected to a rockshaft 20 mounted for oscillating movement in brackets 21 secured to the tractor body 10. The ends of the rockshaft 20 are bent rearwardly and are rigidly connected to an arched member 22 which supplies means for the application of power, as will be hereinafter described. An actuating lever 23 for throwing the power lift into operation is extended to a position adjacent the operator's station 24 on the tractor.

As an example of an implement in which the invention may be embodied, a three-row lister has been illustrated. The lister shown is of a particular construction providing certain desirable flexibility of the units. A transverse bar 25 forms the front of a wheel supported frame structure on which the cultivating tools are mounted. At each end of the bar 25 a rearwardly extending link 26 is pivoted on a vertical axis. Said link is pivoted at its rear end to the cultivating unit frame 27, which will be referred to only as a complete unit. Said frame includes an arcuate member 28 at its forward end, which extends slidably through a guide 29 on the link 26. This construction provides for lateral movement of the cultivating unit. The frame of the cultivating unit is supported by standards 30 and links 31 on wheels 32. The wheels of each pair are spaced a sufficient distance to ride along the furrows of listed planting. Rearwardly extending members 33 of the lister frames 27 provide means for mounting disk cultivating units 34 as illustrated.

In the lister cultivator illustrated the main frame 35 of the center unit is connected by parallel, longitudinally extending bars 36 to the transverse bar 25. A rearwardly arched member 37 rigidly secured to the transverse bar 25 forms a support for the parallel bars 36 and limits movement of the center unit supported by said bars. Brackets 38 secured to the sides of the arched member 37 support a transversely extended rod 39. Said rod extends under guide rollers 40 mounted on the frames 27 of the end units to hold said units against tipping about longitudinal axes. The frame 35 of the center unit is also provided with wheels 32 mounted on standards 30 and with rearward extensions 33 carrying cultivating elements 34.

It is to be understood that the particular form of the implement is not a part of the present invention. It is, however, important to mention the general nature of the complete frame structure and the location of the supporting wheels and the soil working elements on the frame structure. It will be noted that the supporting wheels are at the rear of the frame structure taken as an entire unit with the bar 25 considered as the front. It will also be noted that the cultivating elements are closely positioned behind the axis of the wheels. It is, therefore, evident that, without means of support other than the wheels, the frame structure will tip forwardly, lifting the soil working elements out of soil engaging position. It is likewise evident that lifting the front of the frame structure will tilt the frame rearwardly and bring the weight of the frame on the soil engaging elements, holding them in working position. It is to a means for applying power for this tilting operation that the present invention relates.

A center draft member 41 and two outside draft members 42 are pivoted on a transverse axis to brackets 43 mounted on the transverse member 25. The outside bars converge in the forward direction and all three of the bars are secured to a connecting member 44. Said member contains a plurality of vertically spaced openings for being adjustably secured to a clevis 45. Said clevis is secured by a pin 46 to the clevis 14 on the drawbar of the tractor. Any type of drawbar may be utilized, providing the drawbar is held against swinging vertically.

Controlling means for the implement is provided by the lifting or tilting member 47. Said member is formed at its rear end, as shown in Figure 3. A downward depending portion is rigidly secured between the adjacent portions of two bars 48 which are secured to the transverse bar 25 and to the rear portion of the arch 37. This construction provides a strong, rigid connection. It will also be noted that the rear end of the lifting or tilting member 47 rests on a plate 49 bridging the diverging portions of the bars 48 and held in position by hook bolts 50.

Intermediate the ends of the member 47, a spring abutting member 51 is pivotally mounted on a transverse axis. Said member includes spaced, laterally extending portions provided with aligned openings through which a rod 52 extends. A spring 53 abuts the upper side of said member and a stop 54 on the rod which may be adjusted to vary spring tension. The lower end of the rod 52 is pivotally connected to the center draft bar 41.

At the forward end of the lifting member 47 a flexible connection in the form of a chain 55 joins the member with a hook 56 secured to the mid-point of the arched bar 22 mounted on the rockshaft 20. By utilizing a chain as illustrated, an adjustment is provided by varying the length of the flexible connection 55.

In the operation of an organization and implement controlling device as described, the weight of the forward portion of the implement frame normally holds it in the dotted line position shown in Figure 2, tilted forwardly. The spring 53 in the arrangement as shown provides pressure for resiliently holding the implement in this position for transport. It will be noted that the cultivating disks 34 are lifted out of soil engaging position when the implement frame structure is tilted forwardly.

When it is desired to place the implement in operation with elements 34 in working position, the power lift is actuated by the lever 23. Being of the half-revolution type, as illustrated, the rockshaft 20 is rotated by actuation of the lever 23 to bring the member 22 from the dotted line position to the full line position, as shown in Figure 3. By this action, the lifting or tilting member 47 is raised, lifting the forward end of the entire implement frame structure and throwing the soil working elements 34 into ground engaging positions.

For different conditions of operation, it is desirable to tilt the frame structure to different angles for varying the working depth of the elements 34 and the pressure applied thereto. As the power lift mechanism rotates a definite angle for each cycle of operation, there is no adjustment possible in its action. However, the independent variation made possible by the adjustable feature of the flexible connection 55 enables the operator to adjust said connection to provide for the desired position of the implement frame structure. It will be understood that there is no draft applied through the power lift connections, the draft being applied through the draft frame consisting of the members 42 and 43.

It is to be understood that applicants have shown and described only a preferred embodiment of their improved organization for the power actuation of a tractor drawn implement and that they claim as their invention all modifications falling within the scope of the appended claims.

What is claimed is:

1. A tractor drawn implement comprising, in combination with a tractor having a power lift mounted on the tractor and a lifting arm extending rearwardly therefrom, an implement including a frame structure, supporting wheels at the rear of said frame structure and soil working elements mounted behind said wheels, a draft frame pivotally connected to the frame structure on a transverse axis and to the tractor, a frame structure tilting member rigidly secured to the frame structure, and means for connecting said member to the lifting arm on the tractor.

2. A tractor drawn implement comprising, in combination with a tractor having a half-revolution power lift mounted on the tractor and a lifting arm extending rearwardly from the tractor an implement including a frame structure, supporting wheels at the rear of said frame structure and soil working elements mounted behind said wheels, a draft frame pivotally connected to the frame structure on a transverse axis and to the tractor, a lifting member rigidly secured to the frame structure, and adjustable means for connecting said member to the lifting arm on the tractor.

3. A tractor drawn implement comprising, in combination with a tractor having a rearwardly extending drawbar, a half-revolution power lift mounted on the tractor and a lifting arm extending rearwardly from the tractor, an implement including a frame structure, supporting wheels at the rear of said frame structure and soil working elements mounted behind said wheels, a draft frame pivotally connected to the frame structure and to the tractor drawbar, a lifting member rigidly secured to the frame structure and extending forwardly over the draft frame, and adjustable means for connecting said member to the lifting arm on the tractor.

4. In a tractor field implement and in combination with the tractor, a drawbar extending rearwardly from the tractor, a power lift mounted on the tractor and operated thereby, a lifting arm extending rearwardly from the tractor, a wheel supported implement frame structure, a draft frame pivotally connected to said frame structure on a transverse axis and pivotally connected to the tractor drawbar, soil working tools mounted on the frame structure rearwardly of the supporting wheels, a lifting member rigidly secured to the frame structure and extending forwardly thereof over the draft frame, and means for connecting said member to the lifting arm on the tractor.

5. In a tractor field implement and in combination with the tractor, a drawbar extending rearwardly from the tractor, a half-revolution power lift mounted on the tractor and operated thereby, a lifting arm extending rearwardly from the tractor operatively connected to the power lift, an implement frame structure wheel supported rearwardly of its center of gravity, a draft frame pivotally connected to said frame structure on a transverse axis and pivotally connected to the tractor drawbar, soil working tools mounted on the frame structure rearwardly of the supporting wheels, a lifting and tilting member rigidly secured to the frame structure and extending forwardly thereof over the draft frame, and means for connecting said member to the lifting arm on the tractor.

6. In a tractor field implement and in combination with the tractor, a drawbar mounted at a low horizontal level on the tractor, a power lift casing mounted at the rear of the tractor above the drawbar for operation by the tractor, a rockshaft mounted on the power lift casing, means for operating said rockshaft from the power lift, a lever arm extending rearwardly from said rockshaft, a frame structure, a draft frame pivotally secured to said frame structure on a transverse axis and pivotally connected to the drawbar on transverse and vertical axes, cultivating units connected to the frame structure and extending rearwardly therefrom, each unit being supported by a pair of supporting wheels, cultivating elements mounted behind said wheels, a lifting member rigidly secured to the frame structure and extending forwardly over the draft frame adjacent the power take-off shaft, and a flexible connection between the forward end of the lifting member and the arm on the power lift rockshaft.

7. In a tractor field implement and in combination with the tractor, a drawbar mounted at a low horizontal level on the tractor, a power lift casing mounted at the rear of the tractor above the drawbar for operation by the tractor, a rockshaft mounted on the power lift casing, means for operating said rockshaft from the power lift, a lever arm extending rearwardly from said rockshaft, a frame structure, a draft frame pivotally secured to said frame structure on a transverse axis and pivotally connected to the drawbar on transverse and vertical axes, lister units connected to the frame structure and extending rearwardly therefrom, each unit being supported by a pair of supporting wheels and cultivating elements mounted behind said wheels, a lifting member rigidly secured to the frame structure and extending forwardly over the draft frame adjacent the power take-off shaft, a compression spring mounted between said member and the draft frame acting to bring said parts together thereby assisting the action of gravity in lowering the forward side of the frame and lifting the cultivating elements from working position, and a flexible connection between the forward end of the lifting member and the arm on the power lift rockshaft.

WILLIAM S. GRAHAM.
JAMES MORKOVSKI.